UNITED STATES PATENT OFFICE.

EDWARD WILDE, OF NEW YORK, N. Y., ASSIGNOR TO THE AMERICAN STONE PAVING AND CONSTRUCTION CO., A CORPORATION OF SOUTH DAKOTA.

COMPOSITION OF MATTER.

No. 801,951.      Specification of Letters Patent.      Patented Oct. 17, 1905.

Application filed July 13, 1903. Serial No. 165,383.

*To all whom it may concern:*

Be it known that I, EDWARD WILDE, a citizen of the United States, residing at New York, in the county of New York and State of New York, have invented a certain new and useful Improvement in Compositions of Matter, of which the following is a specification.

This invention relates to a composition of matter.

The object of the invention is to produce a composition or compound having an earthy base firmly held together by a binding agent applied as hereinafter described, by which a compound is produced which will serve as a substitute for the common asphalt compounds for pavements, sidewalks, and other purposes and as a substitute for bricks, tile, stone, cement, and other materials in the construction of sewers, drains, cesspools, sea-walls, and numerous other structures where cement, stone, or concrete is now frequently employed.

In carrying out my invention I take a cheap resin and mix a metallic salt therewith. The resin may be pulverized and the metallic salt in pulverized form mixed therewith; but preferably the resin is melted and the metallic salt stirred in. To one hundred pounds of resin I add six to ten pounds metallic salt. Peroxid of iron is the preferred metallic salt; but probably other metallic oxids would answer the purpose.

Oxid of iron when combined with resin is believed to form resinate of iron. Whatever metallic salt is used should be thoroughly incorporated with the resin.

I take any of the common earths—such as clay, sand, gravel, loam, or an admixture thereof—say one thousand pounds. This is heated in a suitable pan or vessel to a temperature of 200° to 250° Fahrenheit or to such temperature that melted resin will not quickly chill when applied thereto. The hot resin and mineral binder is applied to the earthy substance while heated and a thorough admixture and incorporation effected by stirring or shoveling the mass back and forth or preferably by passing through a mixing-machine, such as a concrete-mixer.

When the resinous binder containing the metallic salt, as stated, is thoroughly incorporated with the earthy mass, a plastic mixture will be formed. This will be more or less plastic, according to the base and to the temperature.

I have found that the proportions of the resinous binding agent should vary somewhat. Thus with gravel a less amount of the binder is required than with loam, sand, or pulverized clay. About ten per centum, by weight, of the binding agent gives good results when gravel is used, while fifteen per centum or more of the resinous binder may be needed with sand.

A mixture of sand and loam makes a better earthy base than pure sand. Pulverized clay makes an excellent base.

Impurities of any kind—such as ashes, street-sweepings, &c—may form part of the earthy base.

When the resinous binder is thoroughly mixed with the heated earthy base, and while plastic, the mass may be molded into bricks, blocks, pipes, or tile or spread out to form a surfacing for roads, walks, cellar-bottoms, &c., and may be used in numerous other ways.

When pressed or molded into bricks, pipes, or blocks, and when cooled sufficiently to retain their form, the molded pieces may be thrown into water and will quickly harden.

At any temperature below 160° Fahrenheit the compound will retain its rigidity. If properly prepared, building-blocks of this compound will sustain a pressure approximating two and one-half tons per square inch of surface and may be safely loaded with a weight of more than one ton.

The compound is absolutely impermeable to water when properly made. When properly molded, blocks of this material may be used for any purpose where a waterproof material is needed. As the blocks will melt under a temperature of about 200° Fahrenheit, they are not suitable for building in any location which can be reached by fire. Irrigating or drain pipes, sidewalks, &c., can be made *in situ* mainly from the earthy matter taken from the ditches, and being waterproof and indestructible such will have large commercial value.

I am unable to state exactly what chemical change, if any, takes place by reason of the addition of the metallic salt to the resin as a binder; but I have found by actual test that the addition of the salt nearly doubles the strength of the completed compound.

I have united the ingredients in somewhat-different ways. For instance, the resin may be added to the earthy base while both are hot, and the metallic salt may then be stirred in, or the various substances to form the compound may be mixed cold and the mass thoroughly incorporated and heated to form the composition. In general, it may be said that the more thorough the incorporation or admixture of the ingredients the better will be the hardened compound.

What I claim is—

A substitute composition of matter for pavements, tiling and the like formed by combining resin and an iron oxid in the presence of heat, then incorporating therewith while still heated a finely-divided earthy base and finally compressing the mass before cooling and while yet plastic to obtain the requisite density and texture and permitting the same to cool and harden.

In testimony whereof I affix my signature in presence of two witnesses.

EDWARD WILDE.

Witnesses:
W. A. BARTLETT,
P. THOMPSON.